United States Patent [19]

Shultz

[11] Patent Number: 4,695,447
[45] Date of Patent: * Sep. 22, 1987

[54] DESTRUCTION OF INORGANIC HAZARDOUS WASTES

[75] Inventor: Clifford G. Shultz, Evansville, Ind.

[73] Assignee: Detox International Corporation, St. Charles, Ill.

[*] Notice: The portion of the term of this patent subsequent to Nov. 12, 2002 has been disclaimed.

[21] Appl. No.: 809,976

[22] Filed: Dec. 17, 1985

Related U.S. Application Data

[63] Continuation of Ser. No. 628,998, Jul. 9, 1984, abandoned.

[51] Int. Cl.⁴ .................. C02F 11/00; C02F 1/70; C22B 7/00; C22B 5/04
[52] U.S. Cl. ............................... 423/659; 423/1; 423/44; 423/49; 423/61; 423/62; 423/88; 423/96; 423/97; 423/111; 423/130; 423/322; 423/439; 423/495; 423/510; 423/561 R; 423/625; 423/629; 75/24; 75/27; 75/64; 75/69; 75/70; 75/71; 75/72; 75/77; 75/80; 75/81; 75/85; 75/86; 210/904; 210/906; 210/912
[58] Field of Search .............. 423/412, 561 R, 625, 423/630, 631, 322, 323; 75/27, 68 C, 93 AC, 57, 89

[56] References Cited

U.S. PATENT DOCUMENTS

| | | | |
|---|---|---|---|
| 513,660 | 1/1894 | Vautin | 423/561 R |
| 600,268 | 3/1898 | Placet | 420/528 |
| 605,812 | 6/1898 | Blackmore | 423/561 R |
| 802,941 | 10/1905 | Rossi | 75/27 |
| 878,210 | 2/1908 | Kuhne | 75/27 |
| 902,871 | 11/1908 | Goldschmidt | 75/27 |
| 1,025,426 | 5/1912 | Rossi | 75/27 |
| 1,196,639 | 8/1916 | Badin | 423/412 |
| 1,346,728 | 7/1920 | Turner | 75/27 |
| 1,360,830 | 11/1920 | Turner | 75/27 |
| 1,593,660 | 7/1926 | Lubowsky | 75/27 |
| 1,940,922 | 12/1933 | Sterner-Rainer | 75/93 AC |
| 2,249,336 | 7/1941 | Udy | 75/27 |
| 2,395,291 | 2/1946 | Patterson | 75/93 AC |
| 2,854,327 | 9/1958 | Perrin et al. | 75/27 |
| 3,110,557 | 11/1963 | Spector | 75/27 |
| 3,141,737 | 7/1964 | Barlett | 423/412 |
| 3,190,750 | 6/1965 | Staggers et al. | 420/528 |
| 3,291,597 | 12/1966 | Mellgren | 75/89 |
| 3,343,911 | 9/1967 | Eisenlohr | 423/495 |
| 3,714,337 | 1/1973 | Garet | 423/561 R |
| 4,094,809 | 6/1978 | Ross | 252/626 |
| 4,169,722 | 10/1979 | Fletcher | 75/27 |
| 4,230,053 | 10/1980 | Deardorff et al. | 110/346 |
| 4,246,255 | 4/1979 | Grantham | 423/210.5 X |
| 4,322,395 | 3/1982 | McHenery et al. | 423/412 |
| 4,396,422 | 8/1983 | Matsuno et al. | 75/27 |
| 4,399,108 | 8/1983 | Krikorian et al. | 423/DIG. 12 |
| 4,400,566 | 8/1983 | Colon | 585/359 |
| 4,469,661 | 9/1984 | Shultz | 423/210.5 |
| 4,552,667 | 11/1985 | Shultz | 210/757 |
| 4,599,141 | 7/1986 | Shultz | 201/2.5 |

FOREIGN PATENT DOCUMENTS

| | | | |
|---|---|---|---|
| 29182 | 5/1981 | European Pat. Off. | 423/561 R |
| 51-25471 | 3/1976 | Japan . | |
| 52-57149 | 5/1977 | Japan . | |
| 53941 | 4/1919 | Sweden | 423/561 R |
| 392640 | 5/1933 | United Kingdom | 423/561 R |

Primary Examiner—Gary P. Straub

[57] ABSTRACT

Hazardous waste containing inorganic compounds which contain heavy metals or particular hazardous anionic groups or which are hazardous halides or non-metal oxides or sulfides is contacted with molten aluminum to provide reduction to lower less hazardous oxidation state.

19 Claims, 1 Drawing Figure

DESTRUCTION OF INORGANIC HAZARDOUS WASTES

This is a continuation of application Ser. No. 628,998, filed July 9, 1984, now abandoned.

TECHNICAL FIELD

This invention is directed to destroying hazardous wastes containing inorganic compounds which contain heavy metals or particular hazardous anionic groups or are hazardous metallic or non-metal oxides, sulfides, or halides.

BACKGROUND OF THE INVENTION

Throughout the nation, there are aggregations of hazardous materials which are the subject of great concern. Some have been buried; some have been dumped into open drainage ways; others have been placed in drums which are rusting and leaking. Some of the contaminants are finding their way into both surface and ground water supplies, threatening the health of people both in the immediate areas in which such dumping occurs, and at considerable distance from their origin. Recent legislation has imposed severe restrictions on the movement and handling of such wastes; however, those which have been dumped in the past remain to be cleaned up.

Among the hazardous wastes which await effective methods of detoxification and/or disposal are salts of heavy metals which may be sufficiently soluble to leach into ground water supplies; oxidizing agents which pose the threat of explosion or fire if they come into contact with combustible materials; cyanide compounds; hazardous oxy-anions of metals and non-metals; and other hazardous substances which pose a threat in the environment.

Hazardous wastes which are listed by the Environmental Protection Agency, (Federal Register, May 19, 1980) and which are susceptible to treatment by the invention herein are listed in Table I below.

TABLE I

Calcium chromate
Chromate tanning waste treatment sludges
Chromate plating waste treatment sludges
Arsenious acid
Arsenic acid
Arsenic trioxide
Arsenic pentoxide
Nitrogen dioxide
Nitric oxide
Nitrogen tetroxide
Osmium tetroxide
Vanadic acid
Lead phosphate
Copper production wastes
Antimony catalysts
Thallium chloride
Thallium nitrate
Thallium oxide
Thallium selenate
Selenious acid
Selenium sulfide
Phosphorus sulfide
Sodium cyanide
Plating plant wastewater treatment sludges
Plating bath sludges
Zinc Cyanide
Cyanidation wastewater pond sediments
Barium cyanide
Calcium cyanide
Copper cyanide
Cyanogen
Cyanogen bromide
Cyanogen chloride
Ferric cyanide
Hydrogen cyanide
Isocyanic acid
Nickel cyanide
Potassium cyanide
Potassium silver cyanide
Silver cyanide Table II below denotes some of the materials treatable by the invention herein which are not listed by the Environmental Protection Agency but which constitute a threat, especially if offgrade materials are discarded without treatment.

TABLE II

Chlorites
Chlorates
Perchlorates
Nitrates
Nitrites
Manganates
Permanganates
Sulfites
Sulfates
Persulfates

SUMMARY OF THE INVENTION

The invention herein is directed to the process of treating hazardous waste containing at least one hazardous inorganic constituent to convert the waste to less hazardous form, preferably non-hazardous form, by contacting the waste with molten aluminum to provide reduction of inorganic constituent to lower, less hazardous oxidation state; in many cases to the elemental state.

The hazardous inorganic constituents of the waste which are subject to the reduction treatment herein are selected from the group consisting of (a) heavy metal oxides, (b) heavy metal sulfides, (c) oxidizing anionic groups containing non-volatile heavy metal, (d) anionic groups containing oxygen and volatile heavy metals, (e) non-metal oxides, (f) non-metal sulfides, (g) oxidizing anionic groups containing halogen, (h) anionic groups containing oxygen and volatile non-metal, (i) anionic groups containing sulfur or nitrogen, (j) hazardous halides, and (k) cyanides.

The process herein provides special benefits in the case of inorganic constituents containing volatile elements such as mercury, cadmium, arsenic, selenium and phosphorus which are reduced to elemental form by the process herein and distill off in the presence of the molten aluminum whereby they can be condensed and recovered for re-use.

The process herein can utilize the whole range of molten aluminum temperatures, i.e. from the melting point of aluminum of 660° C. to its boiling point of 2450° C.

The process herein does not require pure aluminum. For example, aluminum alloys containing by weight 50% or more aluminum are readily utilized herein.

As used herein the term "hazardous waste" includes hazardous wastes in their discarded state as well as hazardous wastes which have been subjected to pretreatment.

As used herein the term "heavy metal" is used as meaning those metals in periodic groups IB, IBB, IIIA, IVA, IVB, VA, VB, VIA, VIB, VIIB, and VIII.

The term "elemental state" as used herein refers to a valence of zero.

The term "anionic group" is used herein to means a plurality of atoms associated together which are anionic when in ionized form whether or not they are in ionized form in the hazardous waste.

The term "oxidizing anionic group" is used herein to mean an anionic group as defined above which is an oxidizing agent.

The term "volatile element" is used herein to mean an atom which in the free, i.e. elemental, state tends to vaporize in the presence of the molten aluminum reactant and distill off so that it is readily recovered, e.g. by condensing in a separate chamber or container.

DESCRIPTION OF THE DRAWING

A preferred process for carrying out the invention herein on solids is schematically illustrated in the sole FIGURE of the drawings which is denoted FIG. 1 herein.

DETAILED DESCRIPTION

Figure 1:
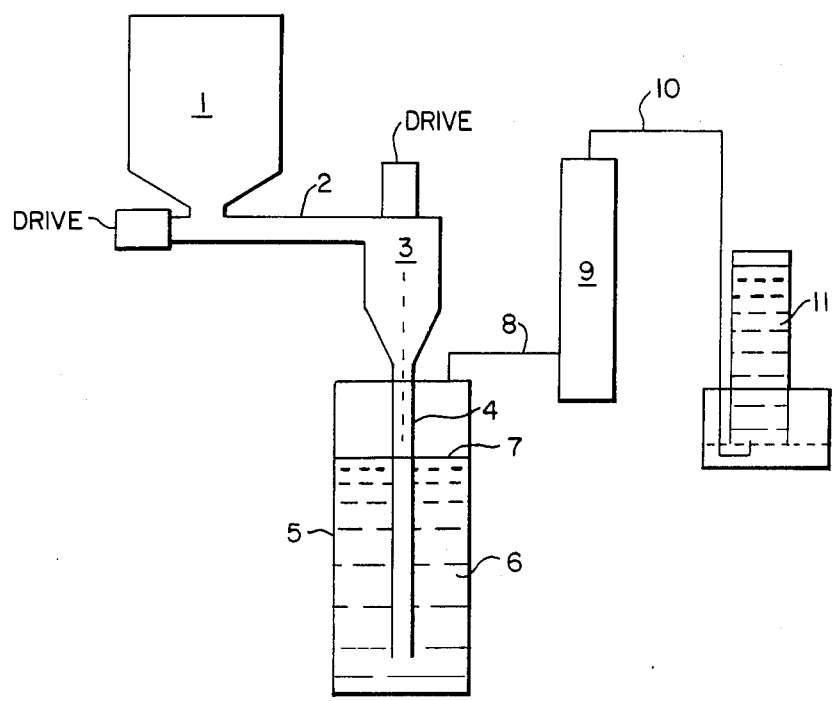

Aluminum is readily available. It is inexpensive, stable at ordinary temperatures and is easy to handle, ship and store. In molten form, it is quite reactive, having a first ionization potential of 5.984 volts. It is a stong reducing agent; this invention utilizes this characteristic to bring about reduction of hazardous heavy metal compounds and anionic group and other toxic or hazardous inorganic compounds. The strong reducing ability of the molten aluminum reduces heavy metals to elemental state. The volatile heavy metals distill off and can be recovered. The non-volatile heavy metals remain in the molten aluminum bath or become part of the slag. The strong reducing ability of the molten aluminum removes part or all of the oxygen from oxygen containing anions reducing the other elements to the elemental state or stable reduced form. Sulfur and halogen react with the aluminum and form aluminum compounds which are retained in the slag or distill from the melt. Thus the molten aluminum treatment enables recovery of useful components and the trapping or isolation of others in less hazardous form thereby eliminating the need to use secure landfills for final disposal. The materials remaining in the slag can be beneficiated from it. Thus, the invention herein provides detoxification of hazardous wastes in an environmentally safe and economical manner combined with the separation and recovery of non-hazardous products.

We turn now in detail to hazardous inorganic constituents of the hazardous wastes treated herein.

The heavy metal oxides can be, for example, oxides of silver, copper, tin, vanadium, manganese, chromium, cadmium, lead, osmium, thallium, zinc, mercury, arsenic, antimony, or bismuth. The process herein reduces the heavy metal to the elemental state. The volatile elements-i.e. mercury, arsenic, and to an extent cadmium and zinc-are vaporized and distilled off from the molten aluminum and can be condensed and reclaimed. The non-volatile heavy metals remain in the melt or in the slag. Those dissolved in the melt are maintained in a harmless environment. Those remaining in the slag can be beneficiated from it.

The heavy metal sulfides can be, for example, sulfides of silver, copper, tin, vanadium, manganese, chromium, cadmium, lead, osmium, thallium, zinc, mercury, arsenic, antimony and bismuth. The process herein reduces the heavy metal to the elemental state. The volatile elements-i.e. mercury and arsenic, and to an extent cadmium and zinc-are vaporized and distilled off from the molten aluminum and can be condensed and reclaimed. The non-volatile heavy metals remain in the melt or in the slag.

The oxidizing anionic group containing non-volatile heavy metal can be, for example, manganate, permanganate, vanadate, chromate and dichromate. The heavy metal is reduced to elemental form by the process herein and remains in the melt or in the slag.

The anionic groups containing oxygen and volatile heavy metal, include, for example, groups containing mercury, arsenic or cadmium, e.g. mercuric oxo ion complexes, arsenate, arsenite, and cadmium oxo complexes. The heavy metal is reduced to elemental form and distills off from the molten aluminum and can be condensed and reclaimed.

The non-metal oxides, can be, for example, nitrogen oxides. These are reduced by the method herein to produce gaseous nitrogen.

The non-metal sulfides can be, for example, phosphorus or selenium sulfides. These are reduced by the method herein to produce phosphorus or selenium in the elemental form which distills off and can be condensed and reclaimed.

The oxidizing group containing halogen normally contains halogen which is chlorine, bromine or iodine. These can be, for example, hypochlorite, chlorite, chlorate, perchlorate, and the analogous salts of bromine and iodine, e.g. bromate or iodate. These are reduced by the method herein to harmless halide ions.

The anionic groups containing oxygen and volatile non-metal selected from the group consisting of selenium and phosphorus include, for example, selenate, selenite, phosphate, phosphite, orthophosphate or pyrophosphate. These are reduced by the method herein to elemental phosphorus or selenium which distill off and can be condensed and reclaimed.

The anionic group containing sulfur or nitrogen can be, for example, sulfate, sulfite, nitrate or nitrite. These are reduced to nitrogen and sulfide by the method herein.

The hazardous halides can be, for example, copper, silver, zinc, cadmium, tin, arsenic, antimony, bismuth, lead, selenium, sulfur, thallium, phosphorus or nitrogen halides, e.g. chlorides, bromides, iodides or fluorides. The heavy metal halides are reduced herein to form elemental heavy metals and the volatile ones distill off the non-volatile ones remain in the molten aluminum or become part of the slag. The non-metal halides selenium, phosphorus are reduced to elemental form and distill off. The nitrogen halides ae reduced to nitrogen gas. The sulfur halides are reduced to sulfur or sulfide.

Several examples of cyanides are listed in Table I above. The cyanide ion is converted to carbon and nitrogen by action of the aluminum.

The wastes treated can contain a plurality of hazardous constituents which are simultaneously treated by the process herein. The volatile elements which are formed are recovered by being condensed or are trapped over water or in a gas bag. Non-volatile heavy metals will remain dissolved in the molten metal and can be recovered from it when the aluminum bath becomes spent or the spent bath can be solidified and disposed of.

A presently preferred method of carrying out the process herein is schematically illustrated in the single figure of the drawing (denoted FIG. 1). In such method, incoming hazardous waste is placed in a receiving hopper 1, which is covered and sealed when not being loaded. The waste is then conveyed by a horizontal screw conveyor 2 to a feed hopper 3. A vertical screw conveyor 4 feeds the waste downward through an open tube which has its terminus near the bottom of a reactor 5 into a bath of molten aluminum 6 having an upper surface 7. Vapors rising from the reaction zone pass through an exhaust vent 8 into a high-temperature (approximately 200° C.) condenser 9, where volatile materials condense. The products which are volatile at this temperature pass through a delivery tube 10 into a water trap 11. Those which are soluble in water or which hydrolyze are caught in the water. Other vapors which are trapped above the water's surface are ordinarily hydrogen generated from hydration water or moisture in the system, nitrogen gas, or low-molecular weight hydrocarbons (if organic compounds are also present).

Gaseous or liquid wastes are readily processed, e.g. by forcing them directly into the melt 6, e.g. by pumping.

The following specific examples are illustrative of the invention.

EXAMPLE I

A 1.8573 gram sample of arsenic trioxide is mixed with 5 g of powdered aluminum in a crucible and heated to the melting temperature of aluminum. A current of air is drawn through a funnel above the crucible and through a cold trap. Elemental arsenic is condensed in the trap and in the connecting tube.

A similar result of elemental arsenic condensation is obtained when arsenic pentoxide or sodium arsenate is substituted for the arsenic trioxide.

EXAMPLE II

A 0.5055 g sample of mercuric oxide was mixed with 5 g of aluminum powder and heated to the melting point of aluminum. The resulting vapors are passed over a cold finger trap where they are condensed. The deposit is dissolved in nitric acid and the presence of mercury is confirmed by atomic absorption spectrophotometry.

EXAMPLE III

A sample of cadmium oxide is placed in a crucible and heated with powdered aluminum to the melting point of aluminum. The resulting vapors are passed over a cold finger trap. Elemental cadmium is condensed in the trap.

EXAMPLE IV

Osmium tetroxide is contacted with molten aluminum. Osmium metal forms and settles to the bottom of the molten bath.

EXAMPLE V

Vanadium pentoxide is contacted with molten aluminum. Vanadium metal forms and dissolves in the aluminum and alloys therewith.

EXAMPLE VI

A 0.1424 g sample of freshly precipitated copper sulfide was heated with molten aluminum. The reaction was exothermic, and the copper was reduced to metal, which settled to the bottom of the molten aluminum. Aluminum sulfide was present in the slag.

EXAMPLE VII

A sample of mercuric sulfide is contacted with molten aluminum. The resulting vapors are passed over a cold finger trap and metallic mercury is condensed.

EXAMPLE VIII

Molten aluminum was poured into a crucible containing 3.0 g sodium chromate. The chromate ion was reduced to chromium (III) oxide, leaving no trace of oxidizing chromate ion. Sodium oxide as left in the residue.

EXAMPLE XI

A mixture of 0.5515 grams of potassium permanganate and 1.6017 grams of powdered aluminum was heated in a furnace. Vigorous exothermic reaction starts at about 800° C. reducing the permanganate to manganese metal. No trace of permanganate remains.

EXAMPLE X

Processing is carried out as set forth in Example IX except potassium manganate replaces the permanganate. No trace of manganate is found.

EXAMPLE XI

A 0.5 gram sample of arsenic acid sodium salt is placed in a crucible with molten aluminum while a current of air is drawn through a funnel above the crucible through a cold trap. Elemental arsenic condenses in a trap and in the connecting tube.

A similar result of elemental arsenic condensation is obtained when arsenious acid is substituted for the arsenic acid sodium salt.

EXAMPLE XII

Nitric oxide is bubbled through molten aluminum and reacts vigorously. No trace of oxidized form of nitrogen remains.

Similar results of no remaining nitrogen oxide is obtained when nitrogen trioxide or nitrogen tetroxide is substituted for the nitric oxide.

EXAMPLE XIII

When selenium sulfide is substituted for the mercuric sulfide in Example VII, elemental selenium is condensed.

EXAMPLE XIV

When phosphorus sulfide is substituted for the mercuric sulfide in Example VII, elemental phosphorus is condensed.

EXAMPLE XV 5.0 ml of 5% sodium hypochlorite solution was mixed with 5.21 g aluminum powder in a crucible, and evaporated to dryness. When dry, it was heated to 700° C. in a muffle furnace. When cooled to room temperature, the solids remaining were triturated with deionized water and filtered. No chlorine or other oxidizing agent is detected. Chloride ion is detected, indicating reduction of 99.9% of the hypochlorite ion.

EXAMPLE XVI

Processing is carried out as in Example VX except that sodium chlorite is substituted for the hypochlorite. Chloride ion is detected in the product indicating reduction of the chlorite.

EXAMPLE XVII

A 0.5 gram sample of sodium chlorate was heated to 700° C. in contact with powdered aluminum. Aqueous extract of the cooled solids showed the absence of any oxidizing agent, and the presence of chloride ion, indicating the complete reduction of the chlorate.

EXAMPLE XVIII

Processing is carried out as set forth in Example XVII except that sodium perchlorate is substituted for the chlorate. The presence of chloride ion is detected in the product indicating reduction of the perchlorate.

EXAMPLE XIX

Processing is carried out as set forth in Example XI except that selenious acid is substituted for the arsenic acid sodium salt. Elemental selenium condenses in the trap.

EXAMPLE XX

Processing is carried out as set forth in Example XI except that lead phosphate is substituted for the arsenic acid sodium salt. Elemental lead remains dissolved in the aluminum and elemental phosphorus condenses out.

EXAMPLE XXI

A 1.0877 gram sample of freshly precipitated silver chloride (AgCl) was mixed with aluminum and heated to 700° C. A "button" of silver metal formed on the bottom of the crucible. A small portion was dissolved in nitric acid. A drop of sodium chloride produced a white precipitate of silver chloride, indicating complete reduction of the metal ion to the metal.

EXAMPLE XXII

Processing is carried out as in Example XI except that selenium chloride is substituted for the arsenic acid sodium salt. Resulting vapors contain elemental selenium which is condensed in a cold trap.

EXAMPLE XXIII

Processing is carried out as in Example XI except that thallium nitrate is substituted for arsenic acid sodium salt. Elemental thallium forms and is dissolved in the aluminum. The nitrate is reduced, forming aluminum oxide and nitrogen gas.

EXAMPLE XXIV 1.1044 g of sodium sulfate was heated at 700° C. in contact with powdered aluminum. The characteristic odor of hydrogen sulfide is detected in the cooled residue, indicating reduction of the sulfate. No sulfate was detected.

EXAMPLE XXV

Processing is carried out as in Example XXIV except that 0.2409 g of sodium sulfite is substituted for the sodium sulfate. The odor of hydrogen sulfide is detected in the residue.

EXAMPLE XXVI 1.0179 g of sodium cyanide was heated to the melting point of aluminum in powdered aluminum. Analysis of the product indicates only a negligible amount of cyanid (4.5 mg/kg).

EXAMPLE XXVII

A hazardous waste mixture consisting of plating plant sludge from cyanide brass plating process is dried and conveyed into molten aluminum. The cyanide is destroyed by conversion to carbon and nitrogen. Copper metal and zinc metal remain dissolved in the aluminum as harmless alloying metals.

While the foregoing describes preferred embodiments, modifications within the scope of the invention will be evident to those skilled in the art. Thus, the scope of the invention is intended to be defined by the claims.

What is claimed is:

1. A process for treating non-radioactive hazardous waste comprising residues left in chemical waste dumps or aggregations of hazardous materials collected at chemical waste storage sites, said process comprising the step of contacting said waste with molten aluminum to provide reduction to lower less hazardous oxidation state.

2. Process as recited in claim 1 wherein said hazardous waste contains some member selected from the group consisting of (a) heavy metal oxides, (b) heavy metal sulfides, (c) oxidizing anionic groups containing non-volatile heavy metal, (d) anionic groups containing oxygen and volatile heavy metal, (e) non-metal sulfides selected from the group consisting of phosphorus and selenium sulfides, (f) oxidizing anionic groups containing halogen, (g) anionic groups containing oxygen and volatile non-metal selected from the group consisting of selenium and phosphorus, (h) anionic groups containing oxygen and sulfur or nitrogen, (i) hazardous halides, and (j) cyanides.

3. Process as recited in claim 2, wherein said member is heavy metal oxide selected from the group consisting of oxides of silver, copper, tin, vanadium, manganese, chromium, cadmium, lead, osmium, thallium, zinc, mercury, arsenic, antimony, and bismuth.

4. Process as recited in claim 3, wherein said heavy metal oxide is selected from the group consisting of mercury, arsenic and cadmium oxides and the process provides reduction to form heavy metal in the elemental state which distills from the molten aluminum.

5. Process as recited in claim 2, wherein said member is heavy metal sulfide and is selected from the group consisting of sulfides of silver, copper, tin, vanadium, manganese, chromium, cadmium, lead, osmium, thallium, zinc, mercury, arsenic, antimony and bismuth.

6. Process as recited in claim 5, wherein said heavy metal sulfide is selected from the group consisting of mercury, arsenic and cadmium sulfides and the process provides reduction to form heavy metal in the elemental state which distills from the molten aluminum.

7. Process as recited in claim 7, wherein said member is oxidizing anionic group containing non-volatile heavy metal, said oxidizing anionic group being selected from the group consisting of manganate, permanganate, vanadate, chromate and dichromate.

8. Process as recited in claim 2, wherein said member is anionic group containing oxygen and volatile heavy metal, said volatile heavy metal being selected from the group consisting of mercury, arsenic and cadmium, and the process provides reduction to form heavy metal in the elemental state which distills from the molten aluminum.

9. Process as recited in claim 2, wherein said member is non-metal sulfide selected from the group consisting of phosphorus and selenium sulfides and the process provides reduction of the phosphorus or selenium to the elemental state and distilling of elemental phosphorus or selenium from the molten aluminum.

10. Process as recited in claim 2, wherein said member is oxidizing anionic group containing halogen and is selected from the group consisting of hypochlorite, chlorite, chlorate and perchlorate, and the analogous oxidizing anionic groups containing bromine or iodine in place of chlorine.

11. Process as recited in claim 2, wherein said member is anionic group containing oxygen and volatile non-metal and said volatile non-metal is selected from the group consisting of selenium and phosphorus and the process provides reduction of the selenium or phosphorus to the elemental state and distilling of elemental phosphorus or selenium from the molten aluminum.

12. Process as recited in claim 2, wherein said member is anionic group containing oxygen and sulfur or nitrogen and is selected from the group consisting of sulfate, sulfite, nitrate and nitrite.

13. Process as recited in claim 2, wherein said member is hazardous halide selected from the group consisting of copper, silver, zinc, cadmium, mercury, tin, arsenic, antimony, bismuth, lead, selenium, sulfur, thallium, phosphorus and nitrogen halides.

14. Process as recited in claim 13, wherein said halide is selected from the group consisting of mercury, phosphorus, arsenic and selenium halide and reduction provides elemental mercury, phosphorus, arsenic or selenium which distills from the molten aluminum.

15. Process as recited in claim 2, wherein said member is a cyanide.

16. Process as recited in claim 1, wherein said hazardous waste contains some member selected from the group consisting of non metal sulfides selected from the group consisting of phosphorus and selenium sulfides and anionic groups containing oxygen and non metal selected from the group consisting of phosphorus, selenium, sulfur, nitrogen, chlorine, bromine and iodine.

17. Process as recited in claim 1, wherein said hazardous waste contains some member selected from the group consisting of non metal oxides and anionic groups containing oxygen and non metal selected from the group consisting of phosphorus, selenium, sulfur, nitrogen, chlorine, bromine and iodine.

18. Process as recited in claim 1, wherein said hazardous waste contains some member selected from the group consisting of (a) heavy metal sulfides selected from the group consisting of copper, tin, vanadium, manganese, chromium, osmium, thallium, zinc, mercury, arsenic, antimony and bismuth sulfides; (b) oxidizing anionic groups selected from the group consisting of manganate, permanganate, vanadate, chromate and dichromate; (c) anionic groups containing oxygen and volatile heavy metal selected from the group consisting of mercury and arsenic; (d) non metal sulfides selected from the group consisting of phosphorus and selenium sulfides; (e) halogen containing oxidizing anionic groups selected from the group consisting of hypochlorite, chlorite, chlorate and perchlorate and the analogous groups containing bromine or iodine in place of chlorine; (f) anionic groups containing oxygen and volatile non metal selected from the group consisting of selenium and phosphorus; (g) anionic groups containing oxygen and sulfur or nitrogen which are selected from the group consisting of sulfite nitrate and nitrite; and (h) hazardous halides selected from the group consisting of copper, zinc, mercury, tin, arsenic, antimony, bismuth, selenium, sulfur, thallium, phosphorus and nitrogen halides.

19. A process for treating a non-radioactive waste selected from the group consisting of (a) chromate tanning waste treatment sludges, (b) chromate plating waste treatment sludges, (c) plating plant waste water treatment sludges, and (d) plating bath sludges, said process comprising the step of contacting said waste with molten aluminum to provide reduction to lower less hazardous oxidation state.

* * * * *

UNITED STATES PATENT AND TRADEMARK OFFICE
CERTIFICATE OF CORRECTION

PATENT NO. : 4,695,447
DATED : September 22, 1987
INVENTOR(S) : Clifford G. Shultz It is certified that error appears in the above-identified patent and that said Letters Patent is hereby corrected as shown below:

Claim 7, line 1, "claim 7" should be --claim 2--.

Signed and Sealed this

Nineteenth Day of January, 1988

Attest:

DONALD J. QUIGG

*Attesting Officer*  *Commissioner of Patents and Trademarks*